US012766581B2

(12) United States Patent
Warmbrunn et al.

(10) Patent No.: US 12,766,581 B2
(45) Date of Patent: Oct. 20, 2026

(54) TOOL FOR FORMING COATED SHEET-METAL BLANKS

(71) Applicant: Maiko Engineering GmbH, Braunschweig (DE)

(72) Inventors: Klaus Warmbrunn, Braunschweig (DE); Marco Hein, Lagesbüttel (DE)

(73) Assignee: Maiko Engineering GmbH, Braunschweig (DE)

( * ) Notice: Subject to any disclaimer, the term of this patent is extended or adjusted under 35 U.S.C. 154(b) by 277 days.

(21) Appl. No.: 18/699,837

(22) PCT Filed: Oct. 13, 2022

(86) PCT No.: PCT/EP2022/078545
§ 371 (c)(1),
(2) Date: May 2, 2024

(87) PCT Pub. No.: WO2023/062142
PCT Pub. Date: Apr. 20, 2023

(65) Prior Publication Data

US 2025/0073771 A1 Mar. 6, 2025

(30) Foreign Application Priority Data

Oct. 14, 2021 (DE) ..................... 10 2021 126 646.7

(51) Int. Cl.
*B21D 28/14* (2006.01)
*B21D 22/20* (2006.01)
(Continued)

(52) U.S. Cl.
CPC ........... *B21D 28/14* (2013.01); *B21D 35/007* (2013.01); *B30B 15/32* (2013.01)

(58) Field of Classification Search
CPC ...... B21D 28/14; B21D 28/02; B21D 35/007; B21D 22/203; B21D 22/22; B21D 51/44; B21D 51/38; B30B 15/32
See application file for complete search history.

(56) References Cited

U.S. PATENT DOCUMENTS 3,768,295 A * 10/1973 Cudzik .................. B21D 51/44 72/347
4,382,737 A * 5/1983 Jensen ................... B21D 51/44 72/405.13

FOREIGN PATENT DOCUMENTS

DE 19842750 A1 4/2000
DE 102015113267 A1 2/2017
(Continued)

OTHER PUBLICATIONS

PCT Written Opinion of the International Searching Authority for International Application No. PCT/EP2022/078545 date of mailing Feb. 13, 2023, 7 pages.
(Continued)

*Primary Examiner* — Mohammed S. Alawadi
(74) *Attorney, Agent, or Firm* — Andrew M. Calderon; Calderon Safran & Wright P.C.

(57) ABSTRACT

The disclosure relates to a tool with a material layer on one or both sides, said tool having a cutting bell rigidly coupled to an upper forming punch and a drawing cushion coupled to a hold-down device, the upper forming punch and a lower forming punch being movable relative to one another to close the tool, and a first gap present between the cutting bell and the hold-down device when the tool is closed, and an end stop formed by the lower forming punch for a lower pressure piece that can be moved relative to it, that the sheet metal blank can be clamped between the upper and the lower pressure piece, and that during a relative movement between the lower forming punch and the lower pressure piece, the
(Continued)

Figure 1A:
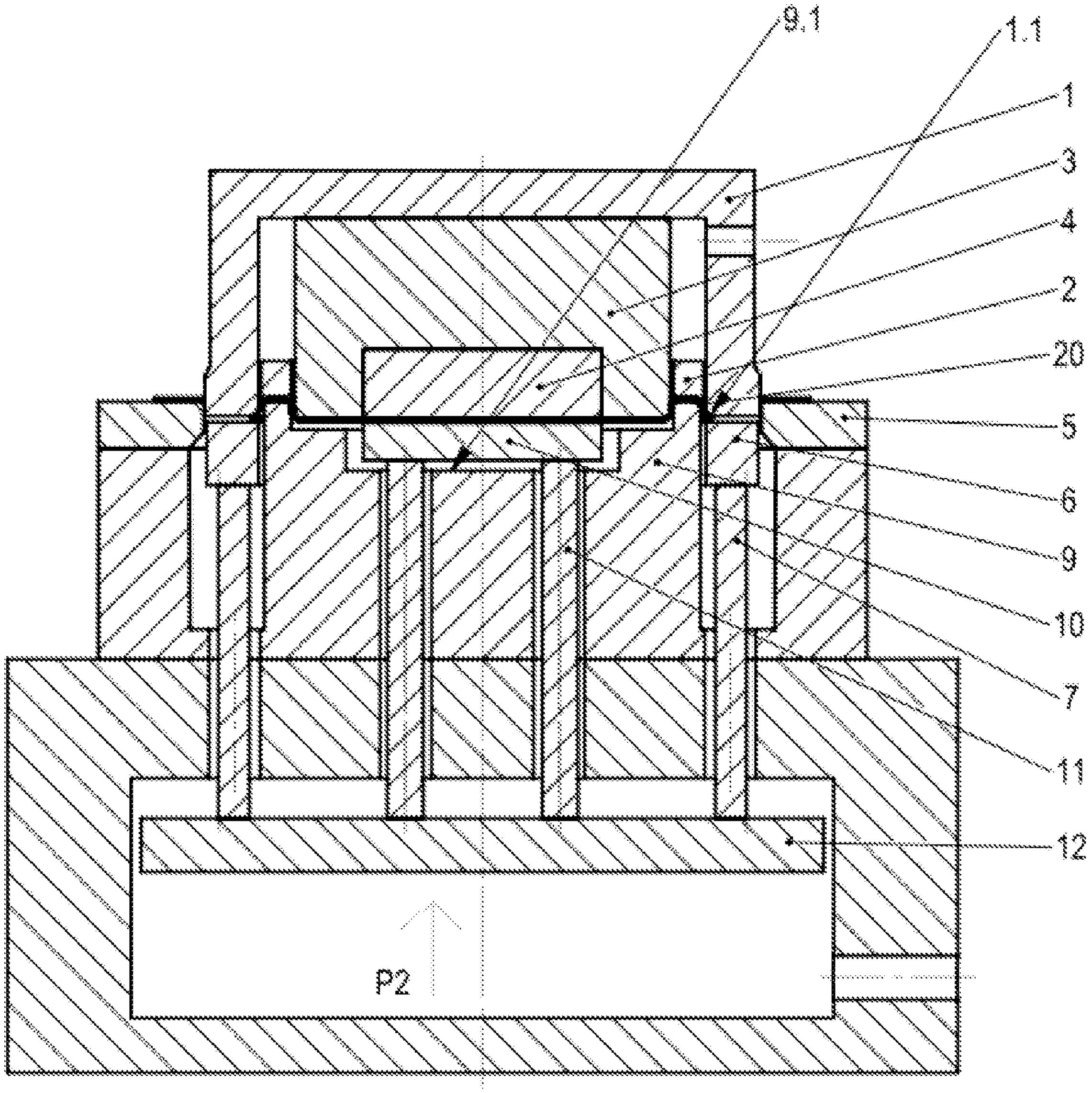

upper and the lower pressure piece remain in their position relative to one another clamping a sheet metal blank.

12 Claims, 6 Drawing Sheets

(51) Int. Cl.

| | |
|---|---|
| ***B21D 22/22*** | (2006.01) |
| ***B21D 28/02*** | (2006.01) |
| ***B21D 35/00*** | (2006.01) |
| ***B21D 51/38*** | (2006.01) |
| ***B21D 51/44*** | (2006.01) |
| ***B30B 15/32*** | (2006.01) |

(56) References Cited

FOREIGN PATENT DOCUMENTS

| | | | | | |
|---|---|---|---|---|---|
| GB | 2080173 A | * | 2/1982 | ............ | B21D 24/14 |
| GB | 2122934 A | | 1/1984 | | |
| JP | S584230 U | | 1/1983 | | |

OTHER PUBLICATIONS

PCT International Search Report for International Application No. PCT/EP2022/078545 date of mailing Feb. 13, 2023, 3 pages.

* cited by examiner

TOOL FOR FORMING COATED SHEET-METAL BLANKS

FIELD OF THE INVENTION

The invention relates to a tool for forming sheet metal blanks provided with a material layer on one or both sides, said tool having a cutting bell which is rigidly coupled to an upper forming punch and a drawing cushion which is coupled to a hold-down device, the upper forming punch and a lower forming punch being movable relative to one another to close the tool, and a first gap being present between the cutting bell and the hold-down device when the tool is closed. The material layer can be a layer of paint, a film or any coating.

BACKGROUND OF INVENTION

Such a tool is known, for example, from DE 10 2015 113 267 A1. The tool can be used, for example, to deep-draw a tin can lid or base, a cup-shaped object, in particular the blank of a screw cap for glass bottles or similar, from a painted sheet.

DE 198 42 750 A1 describes a method for producing deep-drawn hollow parts. In the tool used in this case, the sheet metal blank is clamped between the upper forming punch and the lower pressure piece and deep-drawn in successive steps.

Deep drawing is understood to mean, for example, the forming of a sheet metal blank (round blank, plate) into a tin can lid or base or generally into a hollow body or a hollow body into a hollow body with a smaller circumference with or without an intended change in the sheet thickness. During forming, segments of the blank must be folded up to the raised edge of the product and the intermediate sections displaced. Radial tensile and tangential compressive stresses occur in the process. A bend is created when the cutting bell overflows. The force-loaded hold-down device is provided to prevent the outwardly projecting seam or flange from buckling and forming folds un-der the effect of the tangential compressive stresses.

The lids and bases intended for tin cans are made from relatively thin sheets. Said sheets are painted or coated with a material, especially if they are intended for use in the food industry, and often feature advertising prints.

Sheet metal blanks are not only deep-drawn to form caps for glass bottles, but are also formed into bases or lids for tins, such as food cans.

The problem with production is that the paint or coating cracks in the axial outer area of the sheet during forming and fine threads of paint or lacquer (also known as “angel hair”) form. However, the lacquer threads not only became stuck in the tools, but also on the edge of the blank. A cotton-like consistency forms in the tools, which must be removed regularly. The threads that adhere to the formed part, especially at its edge, must also be carefully removed so that they do not come into contact with the filling product (food) during filling, which would be unacceptable.

Bases and lids for cans are mass-produced items of which large quantities are manufactured in one tool. To remove the threads, the production line that includes the tool must be shut down and blown down or cleaned, which increases production time and thus also the manufacturing costs. The threads must be blown off very carefully so as not to jeopardize the health of the personnel operating the system. The hall in which the system is installed must also be constantly cleaned of the paint threads.

In order to significantly reduce or completely eliminate the formation of threads or tails, particularly at high cycle times, EP 1 663 541 B1 proposes to carry out the punching and drawing step in a first tool while applying force and to interrupt the drawing when the seam has reached a defined width, and then to carry out the drawing in a second tool without a hold-down device and without applying force.

In the tool known from DE 10 2015 113 267 A1, when a predetermined position is reached by the cutting bell, the drawing cushion is pulled away downwards so that the lower forming punch moves faster than the upper forming punch, forming the gap between the cutting bell and the hold-down device and thereby releasing the clamping between the edge of the drawing bell and the hold-down device.

SUMMARY

The engineering effort required to move the drawing cushion and the hold-down device responsible for clamping the sheet metal blank in time in the direction of movement of the upper forming punch (downwards) is high. The invention therefore aims to simplify the design of the tool for forming the gap.

To solve the problem, a tool according to the preamble is characterized in that an end stop can be formed by the lower forming punch for a lower pressure piece that can be moved relative to it, that the sheet metal blank can be clamped between the upper forming punch and the lower pressure piece, and that during a relative movement between the lower forming punch and the lower pressure piece, the upper forming punch and the lower pressure piece remain in their position relative to one another clamping the sheet metal blank.

Due to this design, the upper forming punch and the lower pressure piece can only be moved further together when they are attached to each other, holding the sheet metal between them. The gap that has formed between the cutting bell and the hold-down device at the point when the two components strike against each other can no longer change, but remains constant. The force applied by the upper forming punch to the lower pressure piece during forming is directed into the force- or pressure-loaded drawing cushion, which deflects accordingly.

The lower forming punch can have a pocket-shaped recess in which the lower pressure piece is accommodated. The base of the pocket-shaped recess then forms the end stop for the lower pressure piece.

Preferably, the sheet metal blank can be clamped between the upper forming punch and the lower pressure piece in such a way that a second gap is formed between the sheet metal blank and the cutting bell. The width of the first gap is the sum of the thickness of the sheet metal blank and the width of the second gap.

Preferably, the width of the first gap is up to 200%, preferably between 10 and 50%, greater than the thickness of the sheet metal blank. The width must always be selected depending on the material used for the sheet metal blank.

The width of the gap can also be 0.1 mm greater than the thickness of the sheet metal blank.

Preferably, the drawing cushion is rigidly coupled to the hold-down device and the lower pressure piece. For this purpose, the hold-down device and/or the lower pressure piece can be connected to the drawing cushion via at least one drawing pin. Preferably, three or more drawing pins are provided.

An upper pressure piece can be integrated into the upper forming punch. The width of the first gap can be easily varied or readjusted by replacing the upper, lower or both pressure pieces and by adjusting the drawing pins.

An ejector is preferably provided for ejecting the deep-drawn sheet. The ejector and the drawing cushion can be subjected to a permanent force. The force can be constant or variable.

DETAILED DESCRIPTION OF DRAWINGS

Figure 1B:
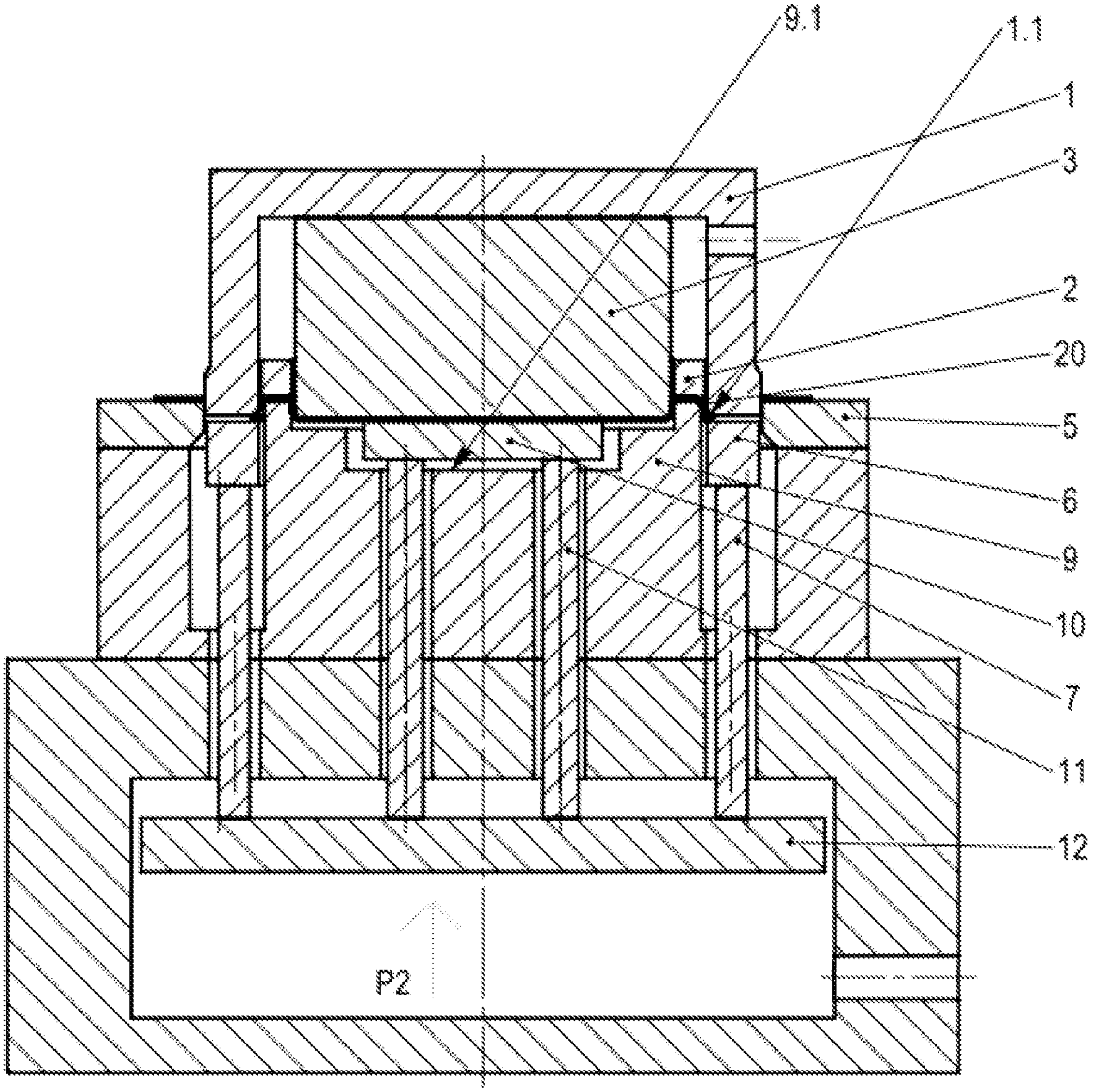
Figure 2B:
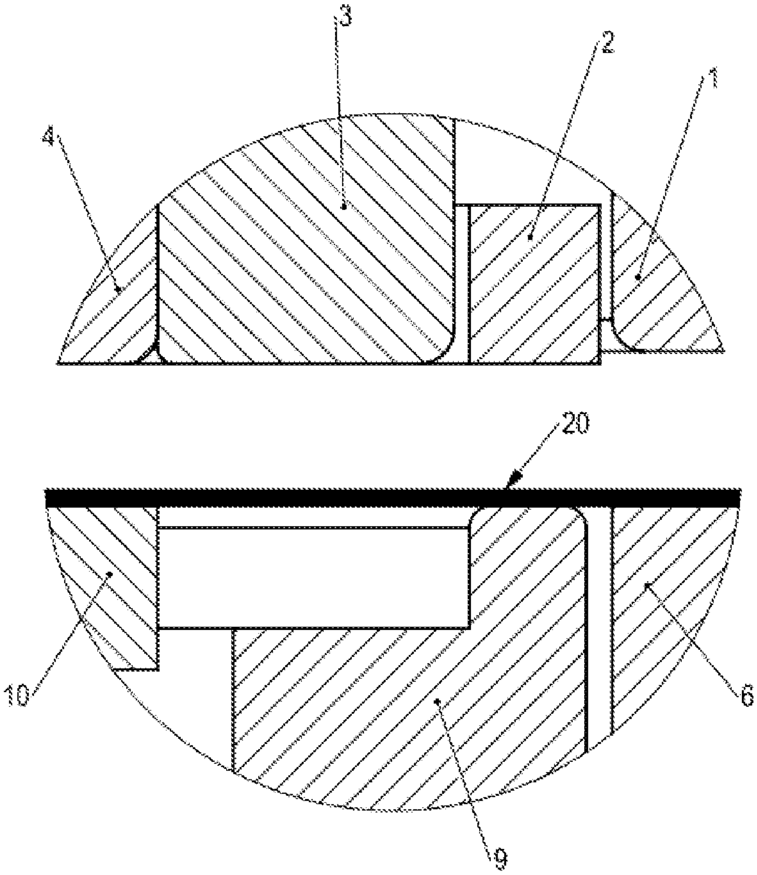
Figure 2A:
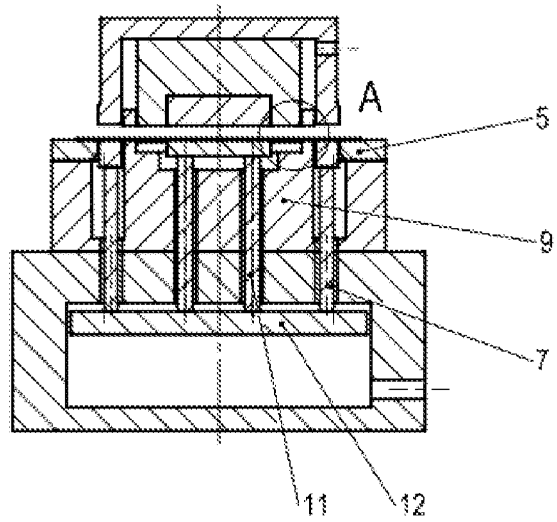
Figure 3B:
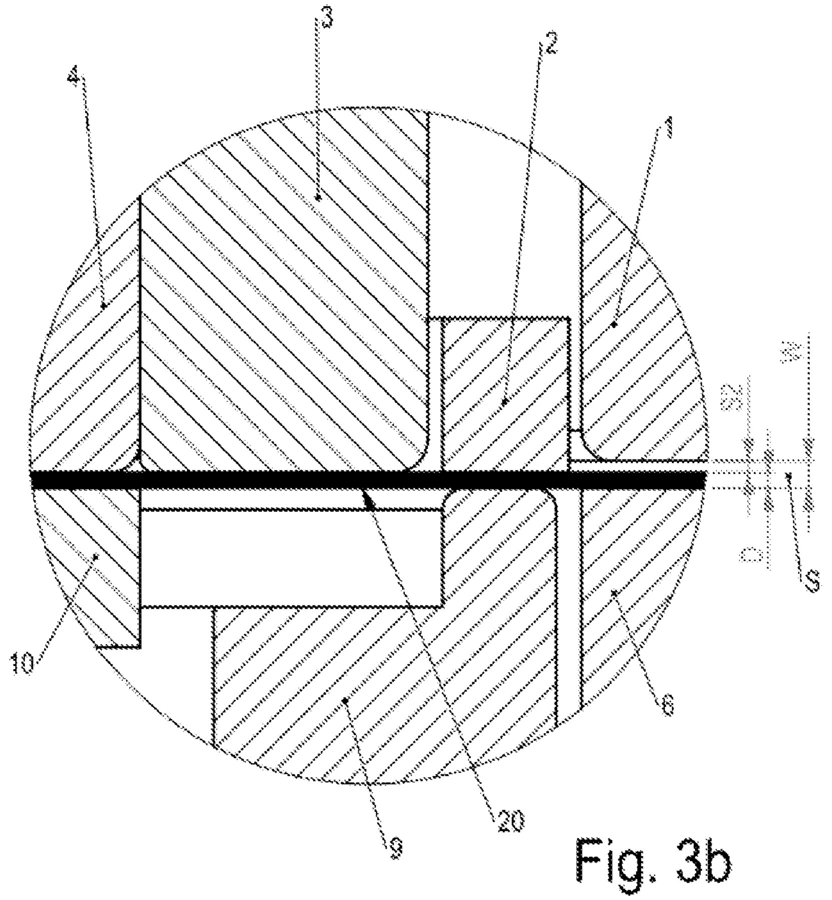
Figure 3A:
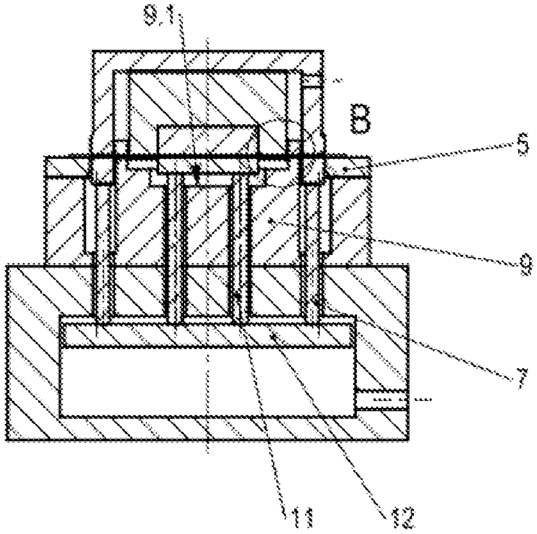
Figure 4B:
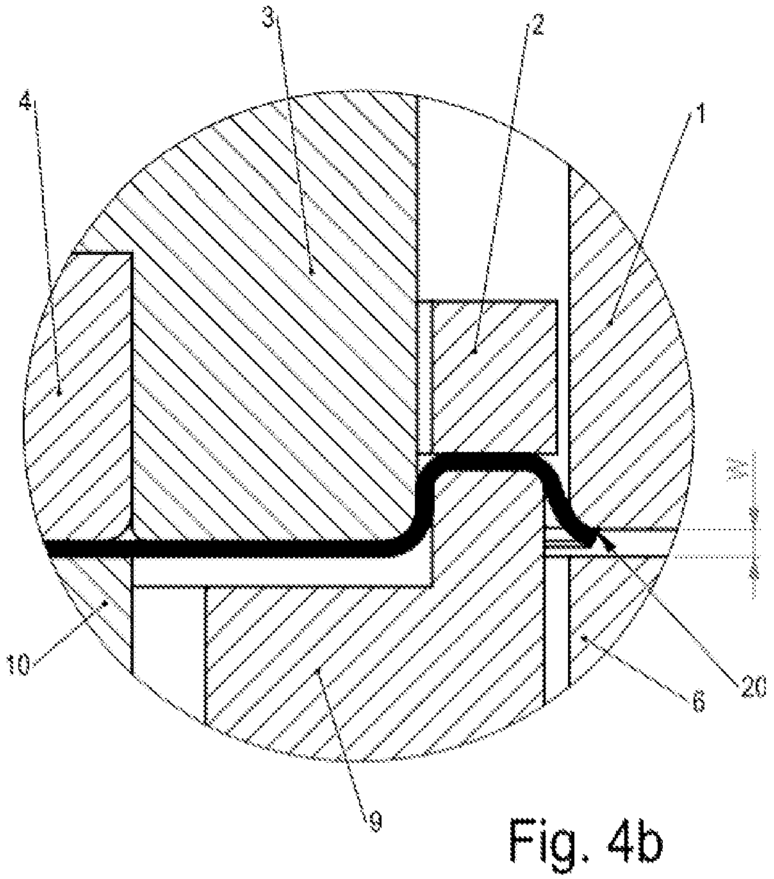
Figure 4A:
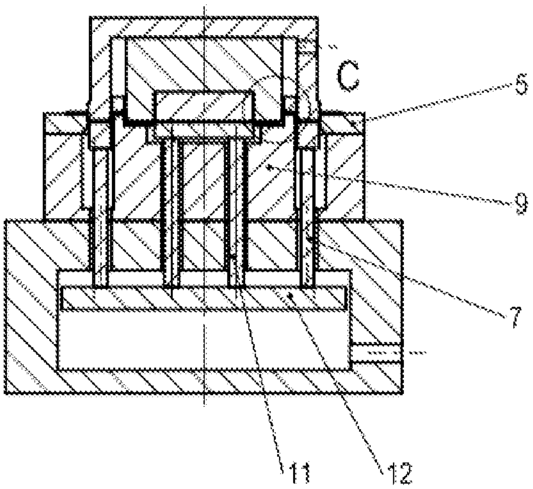
Figure 5B:
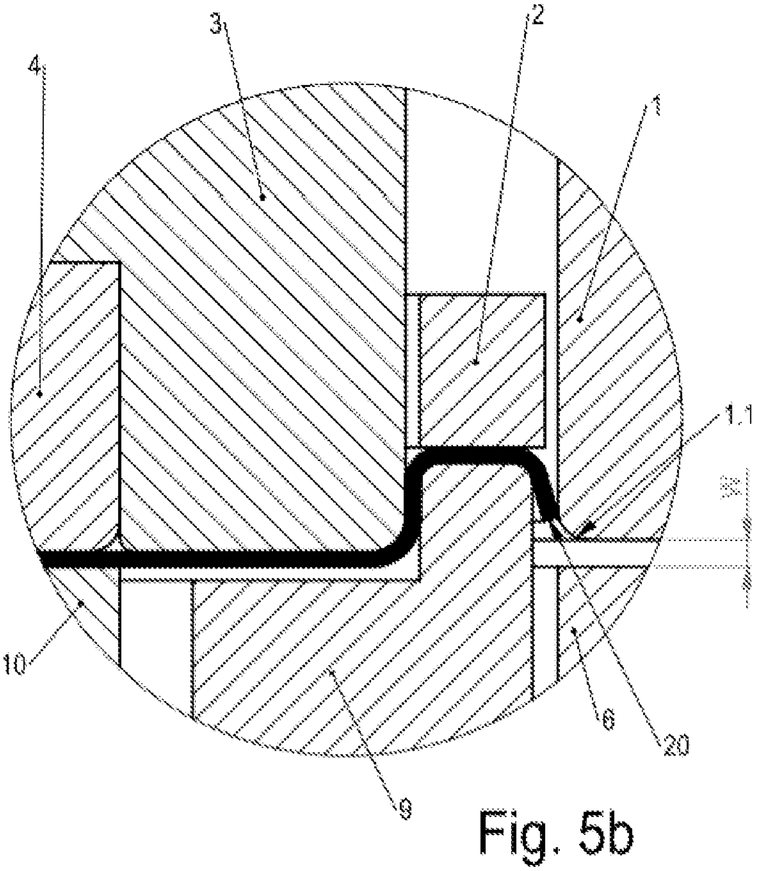
Figure 5A:
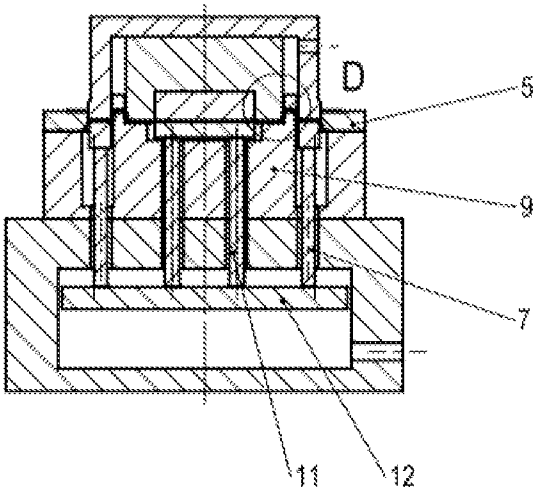

In the following, an embodiment example of the invention will be explained with the aid of accompanying figures. They show:

FIG. 1*a* shows a simplified illustration of a longitudinal cut of a first deep-drawing tool, FIG. 1*b* shows a simplified illustration of a longitudinal cut of a second deep-drawing tool, FIG. 2*a* shows a simplified illustration of a longitudinal cut of a deep-drawing tool, FIG. 2*b* shows an enlarged view of the detail “A” from FIG. 2*a*, FIG. 3*a* shows a simplified illustration of a longitudinal cut of a deep-drawing tool, FIG. 3*b* shows an enlarged view of the detail “B” from FIG. 3*a*, FIG. 4*a* shows a simplified illustration of a longitudinal cut of a deep-drawing tool, FIG. 4*b* shows an enlarged view of the detail “C” from FIG. 4*a*, FIG. 5*a* shows a simplified illustration of a longitudinal cut of a deep-drawing tool, FIG. 5*b* shows an enlarged view of the detail “D” from FIG. 5*a*.

DETAILED DESCRIPTION

As shown in FIG. 1*a*, the deep-drawing tool is essentially composed of the cutting bell 1, the ejector 2, the upper forming punch 3 with the inserted upper pressure piece 4, the cutting ring 5, the hold-down device 6, the lower forming punch 9 with the inserted lower pressure piece 10 and the drawing cushion 12. The hold-down device 6 and the lower pressure piece 10 are connected to the drawing cushion 12 via drawing pins 7, 11. A force P2 acts on the drawing cushion 12, which can be applied pneumatically or hydraulically, e.g. by compression springs. The upper pressure piece 4 is provided on an optional basis, as demonstrated in FIG. 1*b*.

The sheet 20 to be deep-drawn is between the upper forming punch 3 and the lower forming punch 9. The sheet 20 is painted or coated with a material layer (e.g. laminated). The coating material can be chosen at will. FIGS. 2*a* and 2*b* depict the initial position of the tool before forming. FIGS. 3*a* and 3*b* show the start of the deep drawing. The ejector 2 is in contact with the sheet 20. The upper pressure piece 4 rests on the upper side and the lower pressure piece 10, which is inserted into a pocket-shaped recess 9.1 in the lower forming punch 9, rests on the lower side of the sheet 20. The dimensions of the pressure pieces 4, 10 are selected so that a first gap S forms in this position between the cutting bell 1 and the hold-down device 6. The width W of the gap S, which is obtained from the sum of the thickness D of the sheet metal blank 20 and the set gap D1, can be adjusted for the respective application by altering the gap S1.

FIGS. 4*a* and 4*b* show the start of the deep drawing process. The upper forming punch 3 and the lower forming punch 9 continue to move towards each other without the distance between the cutting bell 1 and the hold-down device 6 changing, as the upper pressure piece 4 and the lower pressure piece 10 remain in their position relative to each other. The force that occurs when the tool is closed and that is generated by the upper forming punch 3 and the lower forming punch 9 is transferred from the lower pressure piece 10 via the drawing pins 11 to the drawing cushion 12, which is loaded with the force P2. The lower pressure piece 10 moves in the pocket-shaped recess 9.1 relative to the lower forming punch 3 until it comes to rest in the base of the recess 9.1. The distance between the cutting bell 1 and the hold-down device 6 corresponds to the sum of the thickness D of the sheet metal blank 20 and the set second gap $S_2$. As a result, the sheet 20 can move radially inwards in the annular space between the cutting bell 1 and the hold-down device 6 during deep drawing and is not clamped, thereby stopping any threads from forming at the outer edge of the sheet metal blank 20 during deep drawing.

FIGS. 5*a* and *b* show the final position of the tool. The sheet 20 is completely formed, the annular space between the cutting bell 1 and the hold-down device 6 is still the sum of the sheet thickness D and the set second gap $S_2$. If the inner edge 1.1 of the cutting bell 1 is rounded, it makes it easier to slide the sheet 20 along and minimizes frictional forces acting on the sheet 20.

The forces acting on the drawing cushion 12 and the ejector 2 can be constant. These forces move the drawing cushion 12 and the ejector 2 in the direction of the sheet 20. When mechanical contact is made between the upper pressure piece 4 and the lower pressure piece 10, the sheet 20 is clamped and the force is transferred through the sheet. This results in a certain degree of automatic thickness compensation when using different types of sheet metal. The distance between the cutting bell 1 and the hold-down device 6 required to reduce fuzz adjusts accordingly to the thickness D of the sheet metal blank 20. No additional drive other than the tool or pressing movement itself is needed to create the gap S. As a result, the mechanism for creating the gap S is completely integrated into the tool and no separate attachments are required underneath, next to or outside of the tool.

The mechanism for generating the first gap S ensures a reliable force cut-off below a definable minimum distance between the cutting bell 1 and the hold-down device 6. This force cut-off restricts the clamping force for the sheet 20. The adjustable minimum gap S to the sheet can be maintained very precisely and almost instantaneously thanks to the mechanical end stop with thickness compensation. The tolerances of the resulting gap S are in the range of <0.1 mm.

The invention claimed is:

1. A tool for forming sheet metal blanks provided with a material layer on one or both sides, said tool comprising:

a cutting bell rigidly coupled to an upper forming punch and a drawing cushion coupled to a hold-down device, the upper forming punch and a lower forming punch being movable relative to one another to close the tool;

a first gap being present between the cutting bell and the hold-down device when the tool is closed; and the lower forming punch is capable to be moved relative to a lower pressure piece, the lower forming punch having an end stop for stopping the movement of the lower pressure piece, wherein the sheet metal blank is clamped between the upper forming punch and the lower pressure piece, and during a relative movement between the lower forming punch and the lower pressure piece, the upper forming punch and the lower pressure piece remain in their position relative to one another clamping the sheet metal blank.

2. The tool according to claim 1, wherein the lower forming punch comprises a pocket-shaped recess in which the lower pressure piece is accommodated.

3. The tool according to claim 1, wherein the sheet metal blank is clamped between the upper forming punch and the lower pressure piece in such a way that a second gap $S_2$ is formed between the sheet metal blank and the cutting bell.

4. The tool according to claim 3, wherein a width of the first gap S is a sum of a thickness D of the sheet metal blank and the width of the second gap $S_2$.

5. The tool according to claim 4, wherein the width is up to 200% greater than the thickness.

6. The tool according to claim 4, wherein the width is 0.1 mm greater than the thickness.

7. The tool according to claim 4, wherein the width (W) is 10-50% greater than the thickness.

8. The tool according to claim 1, wherein the drawing cushion is rigidly coupled to the hold-down device and the lower pressure piece.

9. The tool according to claim 1, wherein the hold-down device is connected to athe drawing cushion via at least one drawing pin.

10. The tool according to claim 1, wherein the lower pressure piece is connected to the drawing cushion via at least one drawing pin.

11. The tool according to claim 1, further comprising an ejector provided for ejecting the formed sheet.

12. The tool according to claim 11, wherein the ejector and the drawing cushion are subjected to a permanent force.

* * * * *